United States Patent
Kim

(10) Patent No.: US 11,582,479 B2
(45) Date of Patent: Feb. 14, 2023

(54) METHOD AND APPARATUS FOR REFERENCE AREA TRANSFER WITH PRE-ANALYSIS

(75) Inventor: Hyung Joon Kim, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2594 days.

(21) Appl. No.: 13/542,171

(22) Filed: Jul. 5, 2012

(65) Prior Publication Data

US 2013/0010878 A1    Jan. 10, 2013

Related U.S. Application Data

(60) Provisional application No. 61/504,587, filed on Jul. 5, 2011.

(51) Int. Cl.
*H04N 7/26* (2006.01)
*H04N 19/53* (2014.01)
*H04N 19/433* (2014.01)

(52) U.S. Cl.
CPC .......... *H04N 19/53* (2014.11); *H04N 19/433* (2014.11)

(58) Field of Classification Search
CPC .... H04N 19/56; H04N 19/433; H04N 19/586; H04N 19/53
USPC .................................................. 375/240.26
See application file for complete search history.

(56) References Cited

U.S. PATENT DOCUMENTS

| | | | |
|---|---|---|---|
| 7,409,093 B2* | 8/2008 | Ju | H04N 19/156 375/E7.176 |
| 2005/0078749 A1* | 4/2005 | Ju | H04N 19/107 375/E7.176 |
| 2005/0262276 A1* | 11/2005 | Singh et al. | 710/22 |
| 2006/0188021 A1* | 8/2006 | Suzuki | G06T 7/2073 375/240.16 |
| 2007/0076795 A1* | 4/2007 | Lee | H04N 19/176 375/E7.113 |
| 2008/0212679 A1* | 9/2008 | Lin | H04N 19/423 375/240.16 |
| 2008/0260033 A1* | 10/2008 | Austerlitz | H04N 19/53 375/E7.113 |
| 2009/0296816 A1* | 12/2009 | Drezner | H04N 19/61 375/240.16 |
| 2010/0085488 A1* | 4/2010 | Chien | H04N 19/184 348/E9.037 |
| 2010/0238355 A1* | 9/2010 | Blume | H04N 7/014 348/E5.077 |
| 2011/0050992 A1* | 3/2011 | Han | G06T 7/223 348/E7.003 |
| 2011/0050993 A1* | 3/2011 | Wang | H04N 5/145 348/E7.003 |
| 2011/0080954 A1* | 4/2011 | Bossen | H04N 19/52 375/240.16 |
| 2011/0293012 A1* | 12/2011 | Au | H04N 19/52 375/240.16 |

* cited by examiner

Primary Examiner — William C Vaughn, Jr.
Assistant Examiner — Naod W Belai
(74) Attorney, Agent, or Firm — Carl G. Peterson; Frank D. Cimino

(57) ABSTRACT

A method and apparatus for reduction of reference data transfer and coding efficiency improvement. The method includes performing pre-analysis on a decimated version of an image, and utilizing the predictions of the pre-analysis to transfer smaller reference area.

8 Claims, 2 Drawing Sheets

METHOD AND APPARATUS FOR REFERENCE AREA TRANSFER WITH PRE-ANALYSIS

CROSS-REFERENCE TO RELATED APPLICATIONS

This application claims priority to and incorporates by reference U.S. Provisional Application No. 61/504,587, filed on Jul. 5, 2011.

FIELD OF THE INVENTION

This invention generally relates to a method and apparatus for reference area transfer. More specifically, it relates to performing pre-analysis for transferring a specific reference area.

BACKGROUND OF THE INVENTION

In video processing, minimizing the amount of data transfer from external memory to internal memory for motion estimation (ME) and motion compensation (MC) is critical to reduce power consumption. In general, there is a trade-off between the amount of data transfer and internal memory size, i.e., the amount of data transfer can be reduced by increasing internal memory size and vice versa.

However, because internal memory size is fixed based on silicon area, the amount of data transfer needs to be minimized for a given internal memory size. Thus, there is a need for a reference data transfer method and apparatus that minimizes the amount of data transfer using pre-analysis information for a given internal memory size and that improves coding efficiency.

SUMMARY OF THE INVENTION

An embodiment of the present invention provides a method and apparatus for reduction of reference data transfer and coding efficiency improvement. The method includes performing pre-analysis on a decimated version of an image, and utilizing the predictions of the pre-analysis to transfer smaller reference area.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

To minimize the amount of data transfer using pre-analysis information for a given internal memory size and to improve coding efficiency, utilizing accurate pre-analysis enables to control the amount of data transfer and improves PSNR performance. The proposed method minimizes hardware resources, such as, power consumption and internal memory size, for encoding high resolution videos or fast/complex motion videos and for improving coding efficiency.

For example, minimizing the amount of data transfer from external memory to internal memory for motion estimation and motion compensation is critical to reduce power consumption of a video codec. In general, there is a trade-off between the amount of data transfer and internal memory size, i.e., the amount of data transfer can be reduced by increasing internal memory size and vice versa. However, because internal memory size is fixed based on silicon area, the amount of data transfer needs to be minimized for a given internal memory size. Pre-analysis can provide various information, such as, initial motion search point, motion boundary, partition size, etc., which may be utilized to perform motion estimation that minimizes the amount of data transfer and improves coding efficiency.

Figure 1:
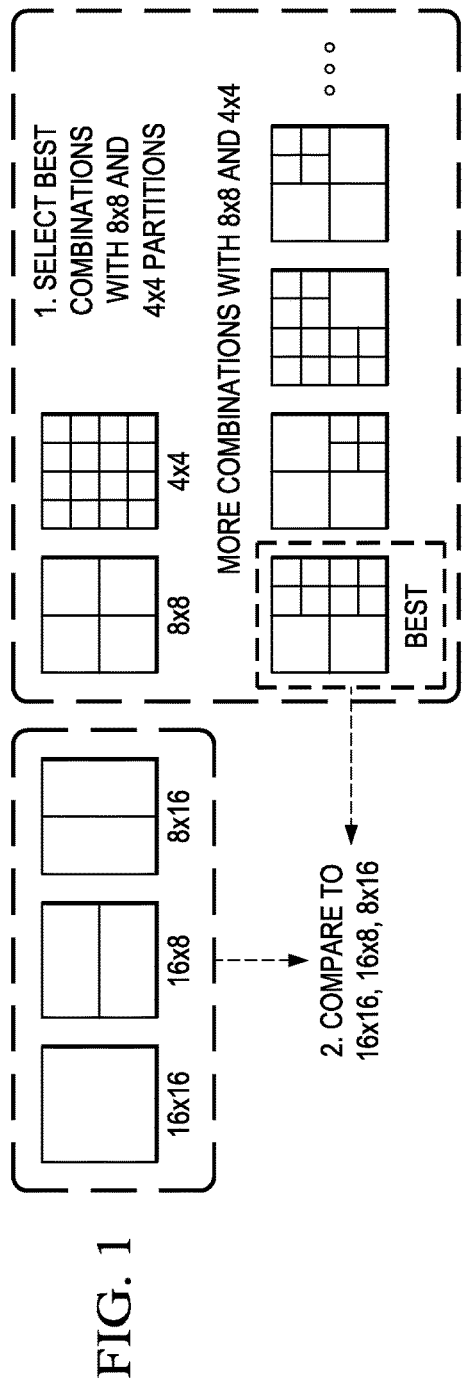
FIG. 1 is an embodiment of partitions and best partition selection.

In one embodiment, as shown in FIG. 1, in pre-analysis, motion estimation (ME) is performed on 4:1 decimated frame, which is resized to ¼ in both horizontal and vertical direction, to generate motion information for main ME on original resolution frame (1:1 domain). Using a 7×7 2D decimation filter to generate 4:1 decimated frames, original frames, usually without reconstructed frame, are decimated and stored into encoder reference memory buffer. FIG. 1 is an embodiment of partitions and best partition selection.

Usually, motion search on 4:1 domain is performed based on 16×16 block (64×64 on 1:1 domain). However, it will generate motion vectors (MV) for smaller blocks within a 16×16 block, as well as, motion vector for the 16×16 block. Neighboring motion vectors (left, upper-left, upper and upper-right) and global MV are used as initial prediction points. In pre-analysis, cost may be evaluated at each point and the best point that produces minimum cost is chosen. More motion vectors, such as, co-located motion vectors can be added to increase prediction accuracy. For each initial prediction point, costs of smaller partitions (16×8, 8×16, 8×8 and 4×4) are also evaluated. Each partition has its own best motion vector.

After determining the best initial motion vector, more points may be searched around the motion vector, such that accurate motion is found. All points within 16×16 and 8×8 search areas around the motion vector for P-type and B-type frame, respectively, are searched. Each partition keeps updating best motion vector during the refinement. After the refinement, each partition has its own best motion vector. To minimize total cost, more combinations with 8×8 and 4×4 partitions are generated. First, we determine best cost for each 8×8 partition (one 8×8 block or four 4×4 block). Then, we compare the best partition to 16×16, 16×8 and 8×16 partitions.

Cost for a search point consists of sum of absolute difference (SAD) and cost for motion vector, where the cost=SAD+lambda*MVD_bits, wherein lambda is a Lagrangian multiplier and MVD_bits is number of bits to encode MV difference between current motion vector and motion vector predictor (MVP). Motion vector predictor is a median of neighboring motion vectors (left, upper and upper-right). Accurate motion vector predictor is available for 16×16 block; however, for smaller partitions, because motion vectors of neighboring blocks are not determined, motion vector predictor of 16×16 block is used.

In one embodiment, search area on 4:1 domain can be determined based on available data transfer bandwidth and internal memory size. The computational complexity for initial predictor evaluation on 4:1 domain is similar to that on 1:1 domain. Refinement of 4:1 domain motion estimation requires more sum of absolute difference calculations, where the main motion estimation may need, for example, 6-tap filtering and 18 sum of absolute difference calculations for fractional-pel search. Thus, assuming computational complexity per 16×16 block is roughly similar to that of main motion estimation, and the total extra computational complexity is (num_16×16/16)*comp_per_16×16, where num_16×16 is a number of 16×16 blocks in a frame and comp_per_16×16 is computational complexity per 16×16 block on 1:1 domain.

Figure 2:
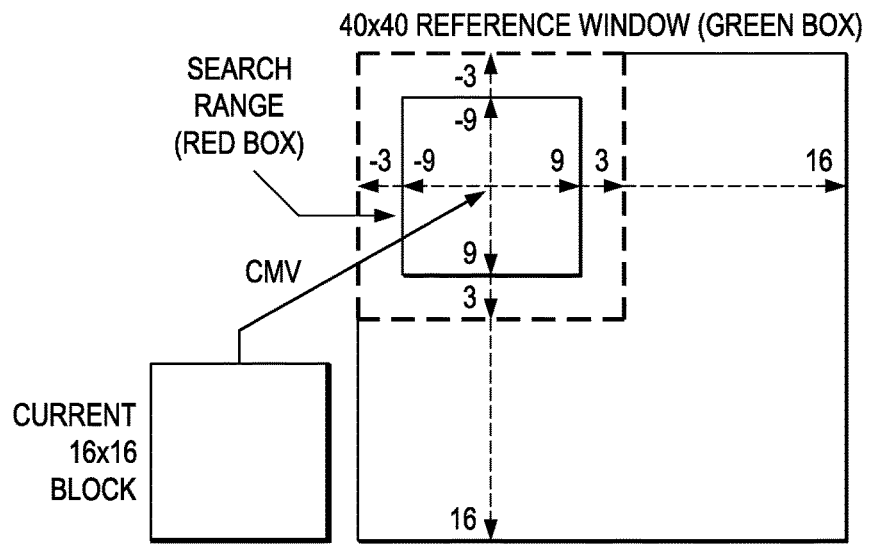
FIG. 2 is an embodiment of a search area and corresponding reference window.

Pre-analysis will produce one MV for each 16×16 on 1:1 domain. Let crude motion vector (CMV) denote the MV from pre-analysis because it is crude on 1:1 domain. Search area on 1:1 domain is determined for each 16×16 block using crude motion vector. Reference window, which is actual area for motion estimation, is calculated based on search range, required number of pixels for fractional-pel search and block size (16×16). For example, when search area is +/−9 around CMV in vertical and horizontal directions, reference window becomes +/−40 around CMV in vertical and horizontal directions (in H.264/AVC). FIG. 2 is an embodiment of a search area and corresponding reference window. In FIG. 2, the reference window size for search area is +/−9. The reference window should be available at internal memory before starting motion search for current 16×16 block. Maximum search range, which is usually different from the search area, on 1:1 domain is four times of search range on 4:1 domain. For example, if maximum search range on 4:1 domain is +/−64, maximum search range on 1:1 domain becomes +/−256.

For motion search on 1:1 domain, neighboring motion vector, global MV, temporal motion vectors and Crude motion vectors are used as initial predictors. However, if a motion vector is not within a valid search area determined by Crude motion vector, then the motion vector will be excluded. Also, crude motion vector is used as an initial predictor to reduce computational complexity at the cost of PSNR performance. Similarly, the best initial predictor may be refined by using 3-step search or grid search. For the best search point, fractional-pel may be performed.

When skip/direct MV is not within a valid search range, reference area for skip/direct motion vector may be transferred from external to internal memory; hence, the cost of skip/direct motion vector can be always evaluated.

At final stage, we select a mode (inter or intra) that produces minimal cost. Since a 16×16 block has its own reference window, the reference window should be transferred from external to internal memory. However, if there is an overlapped area between current reference window and neighboring reference window, only non-overlapped area may be transferred.

Figure 3:
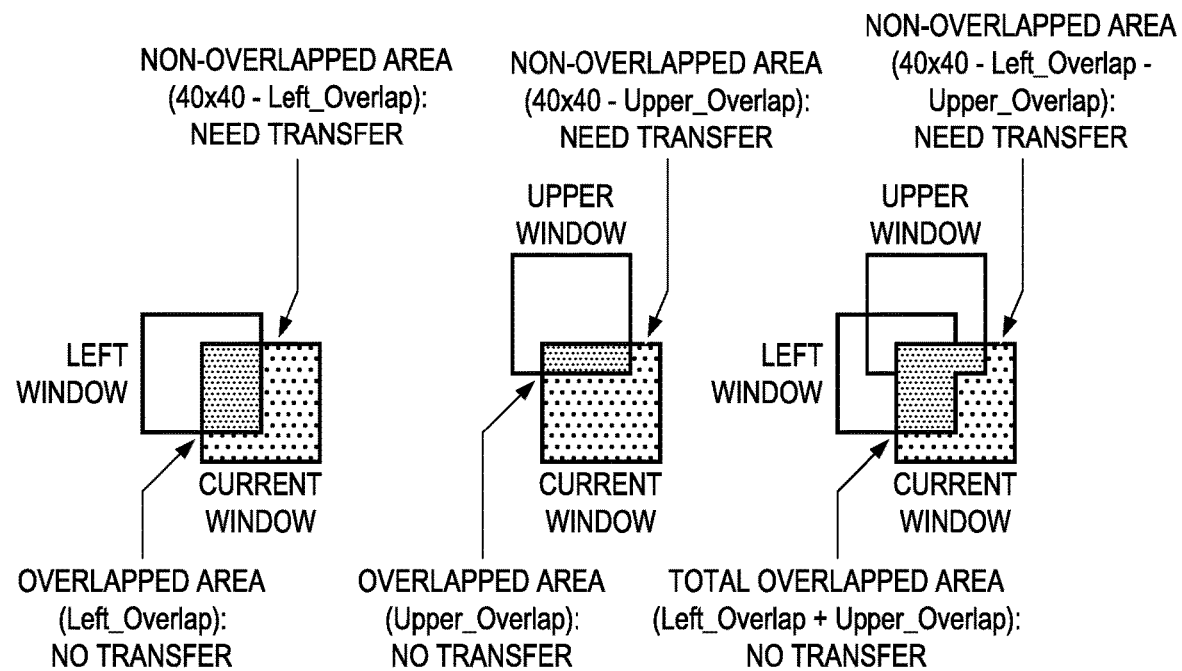
FIG. 3 is an embodiment of an overlapped areas between current and left/upper windows.

FIG. 3 is an embodiment of overlapped areas between current and left/upper windows. In FIG. 3. let Left_Overlap and Upper_Overlap denote overlapped area between current and left windows and overlapped area between current and upper windows, respectively. To minimize data transfer, we can calculate total overlapped area (Left_Overlap+Upper_Overlap) and transfer non-overlapped area.

Alternatively, larger overlapped area is selected and corresponding non-overlapped area is transferred, which increases data transfer but enables to avoid total overlapped area calculation and complex data transfer. In FIG. 3., the amount of data is (40×40−Left_Overlap) because Left_Overlap is larger than Upper_Overlap, i.e., (40×40−Left_Overlap) is smaller than (40×40−Upper_Overlap). Also, left overlapped area may be used to reduce overlapped area calculation and minimize internal memory size.

A skip/direct motion vector may not be within a valid search range. In such a case, the reference area is transferred for the skip/direct motion vector. In one embodiment, the reference area is 22×22 (3+3+16=22 for each direction in H.264), and transferred. There is no overlapped area calculation between skip/direct motion vector reference window and main 40×40 window, i.e., both data transfers are done separately.

In order to ensure real-time operations, instantaneous and average data transfer rate should meet hardware requirement. For example, data transfer rate in IVAHD2.0 is 3584 bytes per 16×16 block for 3840×2160 @ 30 fps. The amount of data transfer (on 1:1 domain) may be estimated with sum of non-overlapped areas of all 16×16 blocks within a frame. Hence, when reference window size is 40×40 for P-type frame, maximum amount of data transfer is 40*40+24*24=2176 bytes per 16×16 block. For B-type frame, if reference window size is 32×32, maximum amount of data transfer is 2*(32*32+24*24)=3200 bytes per 16×16 block. In both cases, maximum amount of data transfer is less than 3584 bytes per 16×16 block, which guarantees real-operations. If overlapped areas are considered, actual amount of data transfer is much less than maximum amount.

The required internal memory size (for 1:1 domain) may be estimated by combining overlapped areas between current reference window and left or upper reference window. If Left_Overlap is larger than Upper_Overlap, Upper_Overlap does not need to be stored, and left overlapped area may be released from internal memory immediately after current window finishes motion search. However, If Upper_Overlap is larger than Left_Overlap, the Upper_Overlap needs to be stored in internal memory until current window finishes motion search.

Figure 4:
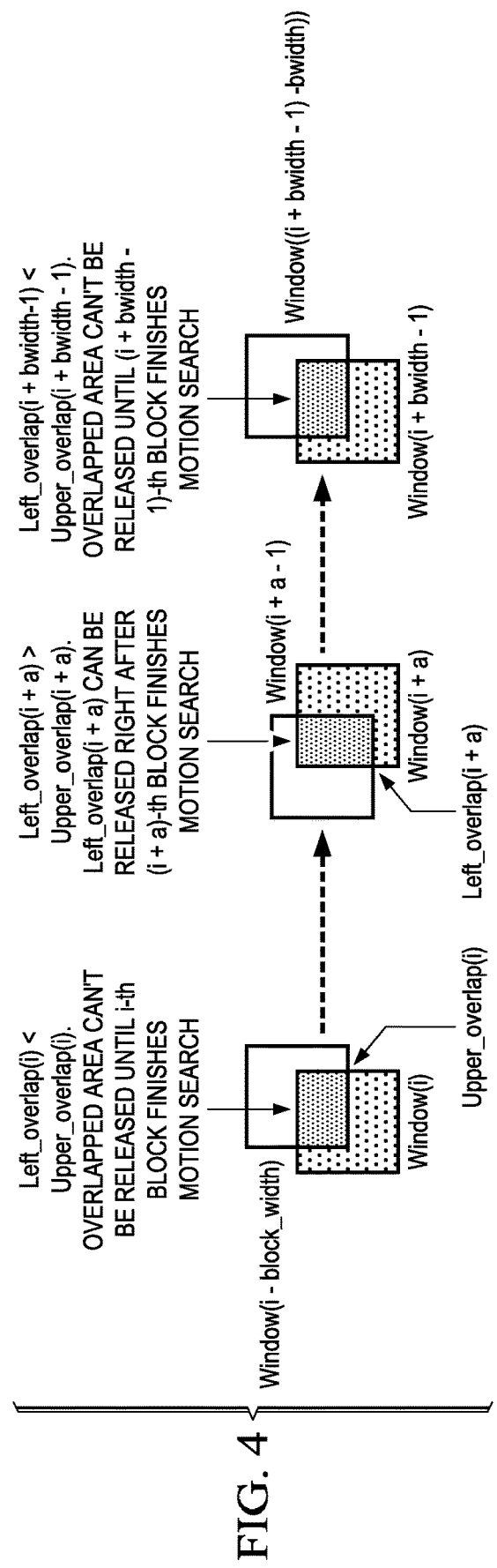
FIG. 4. is an embodiment depicting estimation of required internal memory size.

FIG. 4. is an embodiment depicting estimation of required internal memory size. FIG. 4 shows total internal memory estimation for upper overlapped areas. In FIG. 4, Window(x) denotes reference window of x-th 16×16 block in a frame, bwidth is frame width in 16×16 block unit. Thus, the required internal memory size is sum of Upper_overlap(x), x=i~(i+bwidth−1) and Upper_overlap(x)>Left_overlap(x).

Frame size of 4:1 decimated frame is 1/16 of original frame size. For example, 4:1 decimated frame size for 3840×2160 video is 960×540. If vertical sliding window scheme is used with vertical search range +/−64 (+/−256 on 1:1 domain), total internal memory size for B-type frame is 2*((2*64+16)*(960+32))=285696 bytes per 16×16 block. Maximum horizontal search range is same as frame width (+/−960). The amount of data transfer of vertical sliding window scheme is roughly 16 bytes/4×4 block on 4:1 domain (luma only), which means we need additional transfer of 16 bytes/16×16 block on 1:1 domain.

While the foregoing is directed to embodiments of the present invention, other and further embodiments of the invention may be devised without departing from the basic scope thereof, and the scope thereof is determined by the claims that follow.

What is claimed is:

1. A method comprising:
    performing, with a processor, motion estimation on a first version of a frame to generate a first set of motion vectors based on a first set of search areas, wherein the first set of search areas is determined based on a data characteristic;

determining, with the processor, a second set of search areas for a plurality of blocks in a second version of the frame based on the first set of motion vectors, the second set of search areas being different than the first set of search areas;

performing, with the processor, motion estimation for the second version of the frame based on the second set of search areas to generate a second set of motion vectors; and transferring, by the processor, an overlap area to a memory, wherein the overlap area is a subset of the first set of search areas and the second set of search areas.

2. The method of claim 1, further comprising:

determining a left overlap area between a current reference window and a left reference window;

determining an upper overlap area between the current reference window and an upper reference window; and combining the left overlap area and the upper overlap area to define the overlap area of the current reference window and a non-overlapped area of the current reference window.

3. The method of claim 1, further comprising:

determining a left overlap area between a current reference window and a left reference window;

determining an upper overlap area between the current reference window and an upper reference window; and determining a larger overlap area of the left overlap area and the upper overlap area.

4. The method of claim 1, wherein the data characteristic includes one of available data transfer bandwidth and internal memory size.

5. A non-transitory computer readable medium comprising instructions that, when executed by a processor, cause the processor to:

perform motion estimation on a first version of a frame to generate a first set of motion vectors based on a first set of search areas, wherein the first set of search areas is determined based on a data characteristic;

determine a second set of search areas for a plurality of blocks in a second version of the frame based on the first set of motion vectors, the second set of search areas being different than the first set of search areas;

perform motion estimation for the second version of the frame based on the second set of search areas to generate a second set of motion vectors; and transfer an overlap area to a memory, wherein the overlap area is a subset of the first set of search areas and the second set of search areas.

6. The non-transitory computer readable medium of claim 5, wherein the instructions that cause the processor to transfer the overlap area include instructions that cause the processor to:

determine a left overlap area between a current reference window and a left reference window;

determine an upper overlap area between the current reference window and an upper reference window; and combine the left overlap area and the upper overlap area to define the overlap area of the current reference window and a non-overlapped area of the current reference window.

7. The non-transitory computer readable medium of claim 5, wherein the instructions that cause the processor to transfer the overlap area include instructions that cause the processor to:

determine a left overlap area between a current reference window and a left reference window;

determine an upper overlap area between the current reference window and an upper reference window; and determine a larger overlap area of the left overlap area and the upper overlap area.

8. The non-transitory computer readable medium of claim 5, wherein the data characteristic includes one of available data transfer bandwidth and internal memory size.

* * * * *